United States Patent Office 3,128,286
Patented Apr. 7, 1964

3,128,286
PROCESS FOR PREPARING ANALOGUES
OF GRISEOFULVIN
Thomas Walker, Wembley, and Godfrey Basil Webb,
Greenford, England, assignors to Glaxo Group Limited,
Greenford, England, a British company
No Drawing. Filed Oct. 12, 1961, Ser. No. 144,547
Claims priority, application Great Britain Oct. 21, 1960
10 Claims. (Cl. 260—346.2)

This invention relates to novel processes for the preparation of enol halides of the grisan series.

In copending application No. 106,544, filed May 1, 1961, now Patent No. 3,102,123, there is described the preparation of compounds (which can be described as enol halides) corresponding to the skeletal structure

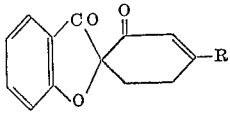

I and

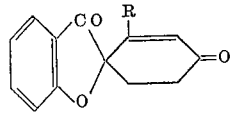

II where R represents a halogen atom, by reacting a grisan acid which corresponds to the structure I or II above in which R is a hydroxyl group, with a halogenating agent serving to convert a carboxyl group (—COOH) to an acid halide group (—CO Halogen). An example of such a halogenating agent which is especially effective is phosphorus oxychloride. In such a process it is found that a mixture of compounds corresponding to structures I and II are formed. In copending application No. 106,544, there is described the use of an alkali metal or alkaline earth metal halide in the reaction to give a product of improved purity and an especially high yield of the normal enol halide of Formula II.

We have found that when the grisan acid is substituted in the 3'-position, reaction thereof with a halogenating agent of the stated kind even in the presence of alkali metal or alkaline earth metal halide leads to very little or none of the normal enol halide, as described in our copending application No. 106,544.

The enol halides of the grisan series are of especial use in the preparation of analogues of griseofulvin and iso-griseofulvin by reaction with alcohols, thiols, amines etc. to replace the halogen atoms by groups other than the methoxy group present in the 2'-position of griseofulvin and the 4'-position of iso-griseofulvin. The conversion of the enol halides to the analogues of griseofulvin and iso-griseofulvin and the utility of these analogues is given in greater detail in copending application No. 106,544. The griseofulvin analogues are, however, of greater interest than the iso-griseofulvin analogues and it will be seen that the above-described process is unsuitable for use as the penultimate step in the production of 3'-substituted griseofulvin analogues.

We have now found that if grisan compounds corresponding to the skeletal structure

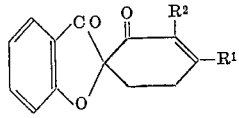

III (in which $R^1$ represents an alkoxy, aralkoxy, aryloxy, primary, secondary, tertiary or heterocyclic amino, alkylthio, aralkylthio or arylthio group and $R^2$ represents an alkyl or aralkyl group or a hydrogen atom or in which $R^1$ represents a primary, secondary, tertiary or heterocyclic amino group and $R^2$ represents a halogen atom) is reacted with a halogenating agent of the stated kind in the presence of an alkali metal or alkaline earth metal halide, the product is not the iso-enol halide corresponding to the skeletal structure

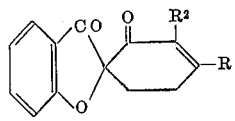

IV where R and $R^2$ have the above meanings, but the normal enol halide corresponding to the skeletal structure

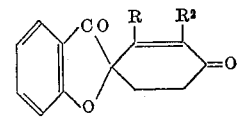

V where R and $R^2$ have the above meanings. Where the group $R^1$ is an ether or thio ether group and $R^2$ a halogen atom, however, the iso-enol halide is obtained as described in copending application No. 144,546, filed October 12, 1961.

We have also found that where a grisan compound corresponding to the skeletal structure

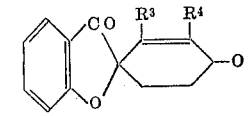

VI (where $R^3$ represents an alkoxy, aralkoxy, aryloxy, alkylthio, aralkylthio arylthio group or a primary, secondary or heterocyclic amino group and $R^4$ represents an alkyl or aralkyl group or a hydrogen or halogen atom) is reacted with a halogenating agent of the stated kind in the presence of an alkali metal or alkaline earth metal halide the iso-enol halide of skeletal structure IV is obtained and not the normal halide of skeletal structure V.

It will be seen, therefore, that this discovery makes it possible to convert an iso-griseofulvin analogue into a griseofulvin analogue or a griseofulvin analogue into an iso-griseofulvin analogue, by carrying out the above-described reaction to obtain the enol-halide of the opposing series and reacting this to replace the halogen atom by a desired group such as an ether or amino group.

The advantage of this procedure is that iso-griseofulvin analogues of little or no biological activity and which may be obtained conveniently and in good yield by the process of copending application No. 106,544 may be converted to analogues in the griseofulvin series. Furthermore, the general high yields and absence of mixtures of enol halides render the process of use in replacing the group in the 2'-position of compounds in the griseofulvin series. This can be achieved by conversion to the corresponding 4'-halogeno-2'-oxo-compound by the present process, conversion of such a compound to a compound of structure III, e.g. by reaction with an alcohol, thiol or amine, reacting the compound of structure III by the present process to yield the normal enol halide and finally replacing the halogen atom by a desired group such as an ether or thio group.

According to the present invention, therefore, we provide a process for the preparation of enol halides corresponding to the skeletal formula

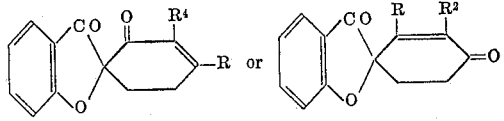 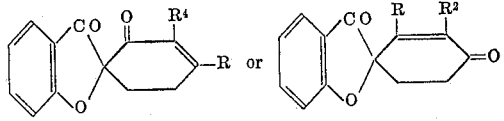

in which a compound corresponding to the skeletal formula

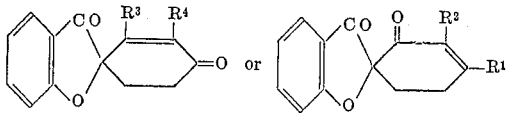

respectively where

R represents a halogen atom;
$R^1$ and $R^3$ represent an alkoxy, aralkoxy, aryloxy, alkylthio, aralkylthio or arylthio group or a primary, secondary, tertiary or heterocyclic amino group;
$R^2$ represents a hydrogen atom or an alkyl or aralkyl group or, optionally, a halogen atom where $R^1$ represents a primary, secondary, tertiary or heterocyclic amino group; and
$R^4$ represents a hydrogen or halogen atom or an alkyl or aralkyl group, is reacted with a halogenating agent serving to convert a carboxyl group (—COOH) into an acid halide group (—CO Halogen), in the presence of an alkali metal or alkaline earth metal halide.

Phosphorus oxychloride is preferred as halogenating agent where chlorination is required and has been found to give specially good results if redistilled shortly before use and mixed with a small quantity of water, preferably between 1 and 4%. The metal halide is preferably a lithium or magnesium halide, lithium chloride being especially effective in conjunction with phosphorus oxychloride. $R^1$ and $R^3$ are preferably alkoxy groups or primary amino groups; $R^2$ and $R^4$ are preferably chlorine or bromine atoms, benzyl groups or alkyl groups having 1 to 3 carbon atoms.

Many halogenating agents are liquid at ambient temperatures and may serve as reaction medium as well as reactant but the reaction may also be carried out in the presence of a solvent, for example a hydrocarbon such as benzene or toluene, a ketone such as acetone or an ester such as ethyl acetate, although dilution of the reactants often reduces the rate of the reaction.

The 3'-substituted starting materials may be prepared for example, by reacting a 3'-substituted grisan acid with phosphorus oxychloride or a similar halogenating agent as described in copending application No. 106,544 and reacting the iso-enol halide of structure IV with an alcohol, a thiol, an amine or ammonia to yield the desired starting material of Formula III. 4'-ethers of structure III can also be obtained directly from griseofulvic acid e.g. by reaction with an alcohol in the presence of an acid catalyst, and may be converted to 4'-amines by reaction with ammonia or an amine. Starting materials of structure VI may be prepared, for example by reacting a normal halide of Formula V with an alcohol or thiol or with an amine or ammonia.

Where a 3'-halo-, 2'- or 4'-amino compound of Formula III or VI is used as starting material it is sometimes found that an imine, for example, of structure

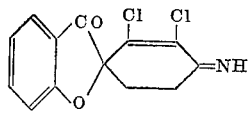

is formed and which may be hydrolyzed to the desired enol halide by hydrolysis e.g. with mineral acid. Such a hydrolysis step is therefore preferably employed in working up the products of the above reaction to improve the yield of enol halide.

The starting materials of Formula III or Formula VI may be substituted in the ring e.g. by alkoxy, aryloxy, aralkoxy, alkylthio, aralkylthio, arylthio, acyloxy, alkyl aralkyl or aryl groups or halogen atoms. Thus, for example, the 4- and 6-positions may carry methoxy groups, the 7-position a chlorine atom and the 6'-position a methyl group as in the close analogues of griseofulvin.

Methods of introducing groupings of the above kind into the 4- and 6-positions are described in our copending applications No. 88,647, filed February 13, 1961, and 79,553, filed December 30, 1960, both now abandoned.

In order that the invention may be well understood we give the following examples, in which all temperatures are in degrees centigrade, by way of illustration only:

EXAMPLE 1

(a) *Preparation of Isogriseofulvamine*

Isogriseofulvin (5 g.) was suspended in dry methanol (200 ml.) and dry ammonia gas passed in over 1¾ hours. The solvent was removed in vacuo, and the residue crystallized from methanol to give isogriseofulvamine (3.0 g.), M.P. 321°, $[\alpha]_D^{20}$ +359° (c., 1.0 in methanol). (Found: C, 54.89; H, 5.24; Cl, 9.93; N, 3.82.

$$C_{16}H_{16}O_5NCl \cdot CH_3OH$$

requires: C, 55.2; H, 5.45; Cl, 9.59; N, 3.71%).

(b) *Preparation of 7,2'-Dichloro-4,6-Dimethoxy-6'-Methylgris-2'-En-3,4'-Dione*

Isogriseofulvamine (1.7 g.) in phosphorus oxychloride (10 ml.) containing water (0.1 ml.) and anhydrous lithium chloride (1.7 g.) was heated on the steam bath for 1 hour. Excess phosphorus oxychloride was removed in vacuo and 2 N hydrochloric acid (20 ml.) added to the residue. The acid solution was extracted with ethyl acetate and the ethyl acetate layer washed with water, 2 N sodium carbonate and water. Evaporation of the solvent gave 7,2'-dichloro-4,6-dimethoxy-6'-methylgris-2'-en-3,4'-dione (0.89 g.), identical with the sample prepared in Example 5.

A further 0.5 g. were obtained from the aqueous acid layer on further standing.

EXAMPLE 2

(a) *Preparation of 3'-Benzylisogriseofulvin*

3'-benzylgriseofulvic acid (63.5 g.), 2,2-dimethoxy propane (18.5 g.), p-toluene sulphonic acid (2.5 g.) and anhydrous methanol (1.5 l.) were refluxed together for 6 hours. The solution was concentrated to 1 l. and cooled overnight. The crystalline solid was collected and recrystallized from methanol to give 3'-benzylisogriseofulvin (44.2 g.), M.P. 149–151°, identical with the sample described in copending application No. 106,544.

(b) *Preparation of 3'-Benzylisogriseofulvamine*

3'-benzylisogriseofulvin (5 g.) was suspended in anhydrous methanol (100 ml.) and dry ammonia gas passed in for 1½ hours. The solution was concentrated and the crystalline solid filtered to give 3'-benzylisogriseofulvamine (3.54 g.), M.P. 185–187°, $[\alpha]_D^{20}$ +196° (c., 1.0 in acetone). (Found: C, 63.7; H, 5.5; N, 3.4; Cl, 8.3. $C_{23}H_{21}O_5NCl \cdot \frac{1}{2}H_2O$ requires: C, 63.3; H, 5.1; N, 3.2; Cl, 8.2%.)

(c) *Preparation of 3'-Benzyl-7,2'-Dichloro-4,6-Dimethoxy-6'-Methylgris-2'-En-3,4'-Dione*

3'-benzylisogriseofulvin (13.2 g.) in phosphorus oxychloride (120 ml.) containing water (4.8 ml.) and anhydrous lithium chloride (10.2 g.) was allowed to stand overnight at room temperature, and then heated on the steam bath for 3 hours. Working up as described in Example 3 and crystallization of the product from ethanol gave 3'-benzyl-7,2'-dichloro-4,6-dimethoxy-6'-methylgris-2'-en-3,4'-dione (6.8 g.), M.P. 123–124°, $[\alpha]_D^{20}$ +279° (c., 1.0 in acetone). (Found: C, 60.7; H, 4.7; Cl, 15.8. $C_{23}H_{20}O_5Cl_2 \cdot \frac{1}{2}H_2O$ requires: C, 60.5; H, 4.6; Cl, 15.5%.)

(d) *Preparation of 3'-Benzyl-7,2'-Dichloro-4,6-Dimethoxy-6'-Methylgris-2'-En-3,4'-Dione*

3'-benzylisogriseofulvamine (1 g.) in phosphorus oxychloride (10 ml.) containing water (0.2 ml.) and anhydrous lithium chloride (1 g.) was heated on the steam bath for 4½ hours. The excess phosphorus oxychloride was removed in vacuo and the residue worked up as in Example 1(b) to give 3'-benzyl-7,2'-dichloro-4,6-dimethoxy-6'-methylgris-2'-en-3,4'-dione (0.8 g.), identical with the sample prepared in Example 2(c).

EXAMPLE 3

*Preparation of 7,4'-Dichloro-4,6-Dimethoxy-6'-Methylgris-3'-En-3,2'-Dione*

Water (0.1 ml.) and anhydrous lithium chloride (1.7 g.) were added to freshly distilled phosphorus oxychloride (10 ml.). When the mixture had cooled to room temperature griseofulvin (1.7 g.) was added and the mixture heated on the steam bath for 1 hour. Excess phosphorus oxychloride was removed in vacuo, water added to the residue and the solution extracted with ethyl acetate. The ethyl acetate extract was washed with water, 2 N sodium carbonate and water, dried over magnesium sulphate and evaporated to dryness giving the pure 7,4'-dichloro-4,6-dimethoxy-6'-methylgris-3'-en-3,2'-dione (1.74 g.), identical with the sample described in our copending application No. 106,544.

EXAMPLE 4

*Preparation of 7,4'-Dichloro-4,6-Dimethoxy-6'-Methylgris-3'-En-3,2'-Dione*

A mixture of griseofulvamine (1.7 g.), anhydrous lithium chloride (1.7 g.) and phosphorus oxychloride (10 ml.) was heated on the steam bath for 15 minutes. The phosphorus oxychloride was removed in vacuo; 2 N hydrochloric acid added to the residue and the mixture heated on the steam bath for a few minutes. After cooling, the solution was extracted with ethyl acetate and the ethyl acetate layer washed with water, 2 N sodium carbonate and water. Removal of the solvent gave the 7,4'-dichloro-4,6-dimethoxy-6'-methylgris-3'-en-3,2'-dione (1.05 g.), identical with the sample described in Example 3.

EXAMPLE 5

*Preparation of 7,2'-Dichloro-4,6-Dimethoxy-6'-Methylgris-2'-En-3,4'-Dione*

Isogriseofulvin (1.76 g.) in phosphorus oxychloride (10 ml.) containing water (0.2 ml.) and anhydrous lithium chloride (1.76 g.) was heated on the steam bath for 10 minutes. Working up as described in Example 3 gave 7,2'-dichloro-4,6-dimethoxy-6'-methylgris-2'-en-3,4'-dione (1.70 g.), identical with the sample described in our copending application No. 106,544.

EXAMPLE 6

*Preparation of 3'-Benzylgriseofulvin*

The chloro compound (prepared in Examples 2(c) and (d)) was refluxed in methanol containing anhydrous potassium carbonate for 20 minutes giving 3'-benzylgriseofulvin identical with the sample described in our copending application No. 106,544.

EXAMPLE 7

*(a) Preparation of 3'-Chloroisogriseofulvin*

3'-chlorogriseofulvic acid (50 g.) in methanol (1 l.) containing p-toluene sulphonic acid (2.5 g.) and 2,2-dimethoxy propane (16 ml.) was refluxed for 1 hour. The solution was concentrated and cooled, and the crystalline solid filtered, washed with methanol to give 3'-chloroisogriseofulvin (39 g.), M.P. 255–9°, identical with the sample described in our copending application No. 106,544.

*(b) Preparation of 3'-Chloroisogriseofulvamine*

3'-chloroisogriseofulvin (10 g.) was suspended in dry methanol (100 ml.) and dry ammonia gas was passed in over 1½ hours. Evaporation of the solvent and crystallization of the residue from nitromethane gave 3'-chloroisogriseofulvamine, M.P. 320°, $[\alpha]_D^{20}$ +285° (c., 0.5 in acetone). (Found: C, 51.46; H, 4.05; N, 3.93; Cl, 18.65. $C_{16}H_{15}O_5NCl_2$ requires: C, 51.65; H, 4.06; N, 3.76; Cl, 19.05%.)

*(c) Preparation of 3'-Chloroisogriseofulvamine*

7,3',4'-trichloro-4,6-dimethoxy-6'-methylgris-3'-en-3,2'-dione (0.71 g.) (cf. our copending application No. 106,544) was suspended in dry methanol (35 ml.) and dry ammonia gas passed in over ½ hour. Evaporation of the solvent and crystallization of the residue from nitromethane gave 3'-chloroisogriseofulvamine, identical with the sample prepared in Example 7(b).

*(d) Preparation of 7,2',3'-Trichloro-4,6-Dimethoxy-6'-Methylgris-2'-En-3,4'-Dione*

3'-chloroisogriseofulvamine (15 g.) in phosphorus oxychloride (150 ml.) containing water (3 ml.) and anhydrous lithium chloride (15 g.) was heated on the steam bath for 5 hours. The excess phosphorus oxychloride was removed in vacuo and the residue treated with water and chloroform. The chloroform extract was washed with water, 2 N sodium carbonate and water, and evaporated to dryness. The crude residue was suspended in acetic acid (150 ml.) containing 2 N sulphuric acid (15 ml.) and the mixture heated on the steam bath for 2 hours. Most of the solvent was removed in vacuo and the residue extracted with ethyl acetate. The ethyl acetate extract was washed with water, 2 N sodium carbonate and water. After drying (MgSO$_4$) the solvent was evaporated and the crude product crystallized from acetic acid to give 7,2',3'-trichloro-4,6-dimethoxy-6'-methylgris-2'-en-3,4'-dione (8.7 g.), M.P. 212–215° and 221–224.5°, $[\alpha]_D^{20}$ +335° (c., 1.0 in acetone). (Found: C, 48.82; H, 3.33; Cl, 27.27. $C_{16}H_{13}O_5Cl_3$ requires: C, 49.07; H, 3.34; Cl, 27.16%.)

EXAMPLE 8

*(a) Preparation of 3'-Bromoisogriseofulvin*

3'-bromogriseofulvic acid (25 g.) was refluxed for 6 hours with methanol (100 ml.) containing dimethoxy propane (30 ml.) and p-toluene sulphonic acid (1.25 g.). After cooling overnight the crystalline product was filtered and washed with methanol giving 3'-bromoisogriseofulvin (22.5 g.), M.P. 248–250°, identical with the sample described in our copending application No. 106,544.

*(b) Preparation of 3'-Bromoisogriseofulvamine*

3'-bromoisogriseofulvin (5 g.) was suspended in methanol (100 ml.) and dry ammonia gas passed in for 1½ hours. The solution was concentrated and the crystalline product filtered to give 3'-bromoisogriseofulvamine (3.89 g.), M.P. 290–5° (decomp.), $[\alpha]_D^{20}$ +227° (c., 1 in acetone). (Found: C, 45.3; H, 3.6; N, 3.4; Hal, 27.65. $C_{16}H_{15}O_5NBrCl.\frac{1}{2}CH_3OH$ requires: C, 45.9; H, 3.6; N, 3.2; Hal, 26.7%.)

*(c) Preparation of 3'-Bromo-7,2'-Dichloro-4,6-Dimethoxy-6'-Methylgris-2'-En-3,4'-Dione*

3'-bromoisogriseofulvamine (1.0 g.) in phosphorus oxychloride (10 ml.) containing water (0.2 ml.) and anhydrous lithium chloride (1 g.) was heated on the steam bath for 4 hours. The reaction mixture was worked up as in Example 7(d) to give 3'-bromo-7,2'-dichloro-4,6-dimethoxy-6'-methylgris-2'-en-3,4'-dione (0.6 g.), M.P. 200° (decomp.), $[\alpha]_D^{20}$ +298° (c., 1.0 in acetone). (Found: C, 44.3; H, 3.2; Hal, 34.1. $C_{16}H_{13}O_5BrCl_2$ requires: C, 44.0; H, 3.0; Hal, 34.6%.)

EXAMPLE 9

*(a) 4'-Amino-7-Chloro-4,6-Dimethoxy-6'-Methyl-3'-Propylgris-3'-En-3,2'-Dione*

7-chloro-4,6,4'-trimethoxy-6'-methyl-3'-propylgris-3'- en-3,2'-dione (12.5 g.) was suspended in anhydrous methanol and ammonia passed in, without cooling, for 1½ hours. The solution was allowed to stand for 2 days, then concentrated and treated with ether. The amine, 10.5 g. (87%), separated as a colourless solid, M.P. 145–150°, $[\alpha]_D^{20}$ +255° (c. 1, acetone).

(b) *7,2'-Dichloro-4,6-Dimethoxy-6'-Methyl-3'-Propylgris-2'-En-3,4'-Dione*

Water (2.0 ml.) was added to freshly distilled phosphorus oxychloride (100 ml.), then dry lithium chloride (10 g.). The mixture was shaken, and 4'-amino-7-chloro-4,6-dimethoxy-6'-methyl-3'-propylgris-3'-en-3,2'-dione (10.5 g.) added. The mixture was heated on the steam-bath with exclusion of moisture for 4 hours, then as much as possible of the phosphorus oxychloride removed under reduced pressure. The residue was cooled and decomposed with water, then extracted into ethyl acetate and the extract washed with 2 N-hydrochloric acid, water, 2 N-sodium bicarbonate, and water, dried (MgSO₄), and evaporated to dryness.

The residue was dissolved in glacial acetic acid (200 ml.) containing 2 N-sulphuric acid (20 ml.) and heated on the steam bath for 2 hours. Removal of the acids under reduced pressure left a residue, which was dissolved in ethyl acetate and washed with water, 2 N-sodium carbonate, and water, dried (MgSO₄), and passed in the cold through kieselguhr and charcoal. Removal of solvent left a solid, which was recrystallized from ethanol, giving the desired chloride 8.23 g. (74%), as colourless crystals, M.P. 196–198°, $[\alpha]_D^{22}$ +307° (c, 1, acetone) (Found: C, 56.9; H, 5.15; Cl, 17.6. $C_{19}H_{20}Cl_2O_5$ requires: C, 57.1; H, 5.1; Cl, 17.8%.)

EXAMPLE 10

*Conversion of 3'-Chlorogriseofulvin Into 7,3',4'-Trichloro-4,6-Dimethoxy-6'-Methylgris-3'-En-3,2'-Dione*

Water (0.2 ml.) was added to phosphorus oxychloride (5.0 ml.) followed by lithium chloride (0.49 g.) and 3'-chlorogriseofulvin (0.49 g.), and the mixture heated on the steam bath for 5 hours. Working up as described in Example 3, and crystallization from acetic acid gave the pure chloride, M.P. 231.5–233°, identical with an authentic sample.

We claim:
1. A process for the preparation of enol halides of the formula

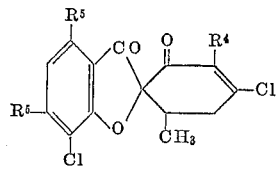

where $R^4$ is a member selected from the group consisting of hydrogen, lower alkyl, and lower aralkyl and $R^5$ is lower alkoxy, said process comprising reacting a compound of the formula

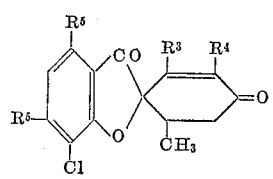

where $R^3$ is lower alkoxy and $R^4$ and $R^5$ have the meanings given above with phosphorous oxychloride in the presence of a metal chloride selected from the group consisting of lithium chloride and magnesium chloride.

2. A process for the preparation of the enol halides of the formula

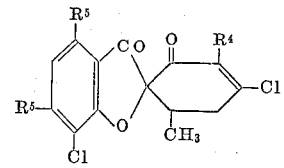

where $R^4$ is selected from the group consisting of hydrogen, lower alkyl, aralkyl, chloro and bromo and $R^5$ is lower alkoxy, said process comprising reacting the compound of the formula

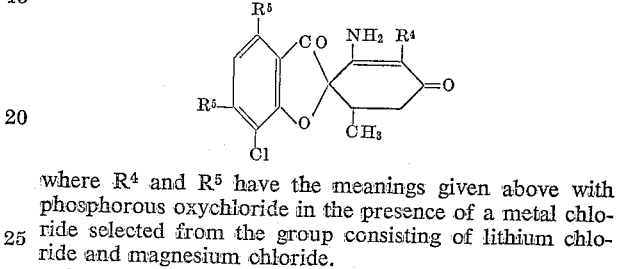

where $R^4$ and $R^5$ have the meanings given above with phosphorous oxychloride in the presence of a metal chloride selected from the group consisting of lithium chloride and magnesium chloride.

3. A process for the preparation of enol halides of the formula

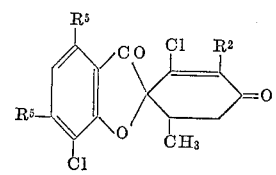

where $R^2$ is a member selected from the group consisting of hydrogen, lower alkyl and aralkyl and $R^5$ is lower alkoxy, said process comprising reacting the compound of the formula

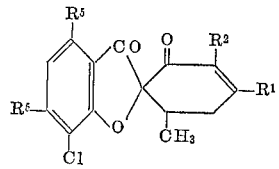

where $R^1$ is lower alkoxy and $R^2$ and $R^5$ have the meanings given above with phosphorous oxychloride in the presence of a metal chloride selected from the group consisting of lithium chloride and magnesium chloride.

4. A process for the preparation of enol halides of the formula

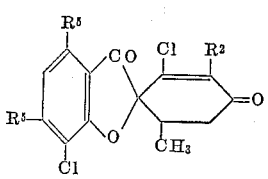

where $R^2$ is a member selected from the group consisting of hydrogen, lower alkyl, lower aralkyl, chloro, and bromo and $R^5$ is lower alkoxy, said process comprising reacting a compound of the formula

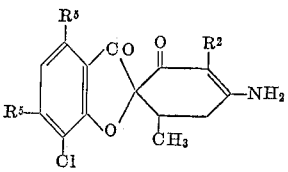

where $R^2$ and $R^5$ have the meanings given above with phosphorous oxychloride in the presence of a metal chloride selected from the group consisting of lithium chloride and magnesium chloride.

5. A process as claimed in claim 1 in which excess phosphorous oxychloride is used as solvent medium.

6. A process as claimed in claim 2 wherein the initial reaction products are hydrolyzed to convert imino groups present into keto groups by reacting said initial reaction product with aqueous mineral acid.

7. A process as claimed in claim 1 in which said phosphorous oxychloride is distilled shortly before use and mixed with 1 to 4% by volume of water.

8. A process as claimed in claim 3 in which excess phosphorous oxychloride is used as solvent medium.

9. A process as claimed in claim 4 wherein the initial reaction products are hydrolyzed to convert imino groups present into keto groups by reacting said initial reaction product with aqueous mineral acid.

10. A process as claimed in claim 3 in which said phosphorous oxychloride is distilled shortly before use and mixed with 1 to 4% by volume of water.

No references cited